(12) United States Patent
Yucel et al.

(10) Patent No.: US 12,742,071 B2
(45) Date of Patent: Sep. 22, 2026

(54) BIODEGRADABLE FILMS FROM DDGS

(71) Applicants: Kansas State University Research Foundation, Manhattan, KS (US); The United States of America, as represented by the Secretary of Agriculture, Washington, DC (US)

(72) Inventors: Umut Yucel, Manhattan, KS (US); Valentina Trinetta, Manhattan, KS (US); Scott Bean, Manhattan, KS (US)

(73) Assignees: Kansas State University Research Foundation, Manhattan, KS (US); UNITED STATES OF AMERICA, AS REPRESENTED BY THE SECRETARY OF AGRICULTURE, Washington, DC (US)

( * ) Notice: Subject to any disclaimer, the term of this patent is extended or adjusted under 35 U.S.C. 154(b) by 428 days.

(21) Appl. No.: 18/570,559

(22) PCT Filed: Jun. 29, 2022

(86) PCT No.: PCT/US2022/035444
§ 371 (c)(1),
(2) Date: Dec. 14, 2023

(87) PCT Pub. No.: WO2023/278523
PCT Pub. Date: Jan. 5, 2023

(65) Prior Publication Data
US 2024/0287309 A1 Aug. 29, 2024

Related U.S. Application Data

(60) Provisional application No. 63/216,733, filed on Jun. 30, 2021.

(51) Int. Cl.
*C08L 99/00* (2006.01)
*C08J 5/18* (2006.01)
(Continued)

(52) U.S. Cl.
CPC ................ *C08L 99/00* (2013.01); *C08J 5/18* (2013.01); *C08K 5/053* (2013.01); *B65D 65/466* (2013.01);
(Continued)

(58) Field of Classification Search
CPC .. C08L 99/00; C08L 2201/06; C08L 2203/16; C08L 2205/06; C08J 5/18;
(Continued)

(56) References Cited

U.S. PATENT DOCUMENTS

2005/0101700 A1* 5/2005 Riebel .................... C08L 23/10 524/17
2007/0135536 A1* 6/2007 Mohanty ........... C08G 18/0895 524/47

FOREIGN PATENT DOCUMENTS

| | | |
|---|---|---|
| CN | 102482499 | 5/2005 |
| CN | 107116659 | 9/2017 |

OTHER PUBLICATIONS

International Search Report and Written Opinion for corresponding PCT Application PCT/US2022/035444, dated Oct. 26, 2022; pp. 10.
(Continued)

*Primary Examiner* — James E Mcdonough
(74) *Attorney, Agent, or Firm* — Hovey Williams LLP

(57) ABSTRACT

One or more embodiments of the invention are directed toward biodegradable films from distiller's dried grains with solubles (DDGS), especially sorghum DDGS, and methods of making the same. The films, which are suitable for use as packaging films, can be produced by directly conditioning the DDGS via a milling process, such as wet milling (e.g., colloid mill and ball milling) in water or a sodium hydroxide solution. The milled slurry is co-dissolved with plasticizers and stabilizers (preferably all less than 1% by weight) in a mixture of water and an organic solvent. The mixture is then
(Continued)

used for film processing via pour-casting. The biodegradable films have significant antioxidant and antimicrobial activities related to their phenolic content.

22 Claims, 6 Drawing Sheets

(51) Int. Cl.
*C08K 5/053* (2006.01)
*B65D 65/46* (2006.01)

(52) U.S. Cl.
CPC ........ *C08J 2399/00* (2013.01); *C08J 2405/00* (2013.01); *C08L 2201/06* (2013.01); *C08L 2203/16* (2013.01); *C08L 2205/06* (2013.01)

(58) Field of Classification Search
CPC ... C08J 2399/00; C08J 2405/00; C08K 5/053; B65D 65/466
USPC .................................................... 106/205.72
See application file for complete search history.

(56) References Cited

OTHER PUBLICATIONS

Prabhakumari, Parvathy et al., Development and characterisation of protein films derived from dried distillers' grains with solubles and in-process samples, Industrial Crops and Products, May 15, 2018 (Online publication date), vol. 121, pp. 258-266.

* cited by examiner

BIODEGRADABLE FILMS FROM DDGS

CROSS-REFERENCE TO RELATED APPLICATIONS

This Application is the U.S. National Stage of International Patent Application No. PCT/US2022/035444, filed Jun. 29, 2022, entitled BIODEGRADABLE FILMS FROM DDGS which claims the benefit of U.S. Provisional Patent Application Ser. No. 63/216,733, filed Jun. 30, 2021, and entitled "BIODEGRADABLE FILMS FROM DDGS", each of which is incorporated by reference herein in its entirety.

STATEMENT REGARDING FEDERALLY-FUNDED RESEARCH

This invention was made with U.S. Government support under grant number 58-3020-9-009 awarded by the Department of Agriculture. The government has certain rights in the invention.

BACKGROUND OF THE INVENTION

Field of the Invention

According to one or more embodiments, the present invention is directed towards processes for forming biodegradable films from distiller's dried grains and solubles (DDGS). The films produced can be suitable for use in, for example, food packaging materials.

Description of the Prior Art

Renewable biodegradable packaging films have gained popularity around the world due to great environmental concerns and sustainability problems. Synthetic polymers have been preferred as a basis for producing packaging materials due to their good film-forming properties and significant barrier capacity against oxygen, moisture, or light. For various reasons, greener alternatives to these materials are being sought. Cereals and grains, which are natural sources of polymers, have been the focus of researchers seeking to replace petroleum-based materials.

DDGS is a by-product of the distillation process during ethanol production and is mainly used in livestock sector and animal feeding due to its high nutritional value. Maize has a highly fermentable starch content has been the primary grain source for wet milling and dry-grind ethanol production in recent times. On the other hand, distillers by-products from different grain sources may show compositional variations, which can affect the characteristics of products produced therefrom. Among the other grain sources, sorghum (*Sorghum bicolor L. Moench*) has the most similar composition as maize. As compared to maize, though, it has higher drought tolerance and quick adaptability to various environments. It is the third most commonly grown cereal crop in the United States and the fifth in the world. Approximately, 20-25% of total production of sorghum is processed during ethanol production.

There is a need for replacing synthetic plastic packaging film materials with biodegradable films produced from sustainable resources. The ready availability, low cost, and compositional characteristics of DDGS, especially sorghum DDGS may make it a suitable raw material for film production. However, there has yet to be developed a process for sufficiently modifying DDGS to be used to create films.

SUMMARY OF THE INVENTION

According to one embodiment of the present invention there is provided a method of forming a biodegradable film comprising milling a quantity of distiller's dried grains with solubles (DDGS) to reduce the particle size of the DDGS. The size-reduced DDGS are combined with one or more plasticizers to form a DDGS mixture. The DDGS mixture is mixed with respective quantities of water and one or more organic solvents to solubilize at least a portion of the DDGS and form an aqueous dispersion. The biodegradable film is cast from the aqueous dispersion.

According to another embodiment of the present invention there is provided a method of forming a biodegradable film comprising wet milling a quantity of sorghum distiller's dried grains with solubles (DDGS) to reduce the particle size of the DDGS. Optionally, the wet milled DDGS are dried to form dried, size-reduced DDGS particles. The size-reduced DDGS particles are combined with a quantity of glycerol and least one of xanthan gum and locust bean gum to form a DDGS mixture. The DDGS mixture is mixed with respective quantities of water and chloroform, and optionally ethanol, to form an aqueous dispersion. The aqueous dispersion is cast to form the biodegradable film.

According to still another embodiment of the present invention there is provided a film-forming composition comprising milled distiller's dried grains with solubles (DDGS) and one or more plasticizers that have been at least partially solubilized in a liquid medium, the liquid medium comprising water and at least one organic solvent.

According to a further embodiment of the present invention there is provided a biodegradable film comprising film-forming composition as described herein.

DETAILED DESCRIPTION OF THE PREFERRED EMBODIMENT

Figure 6:
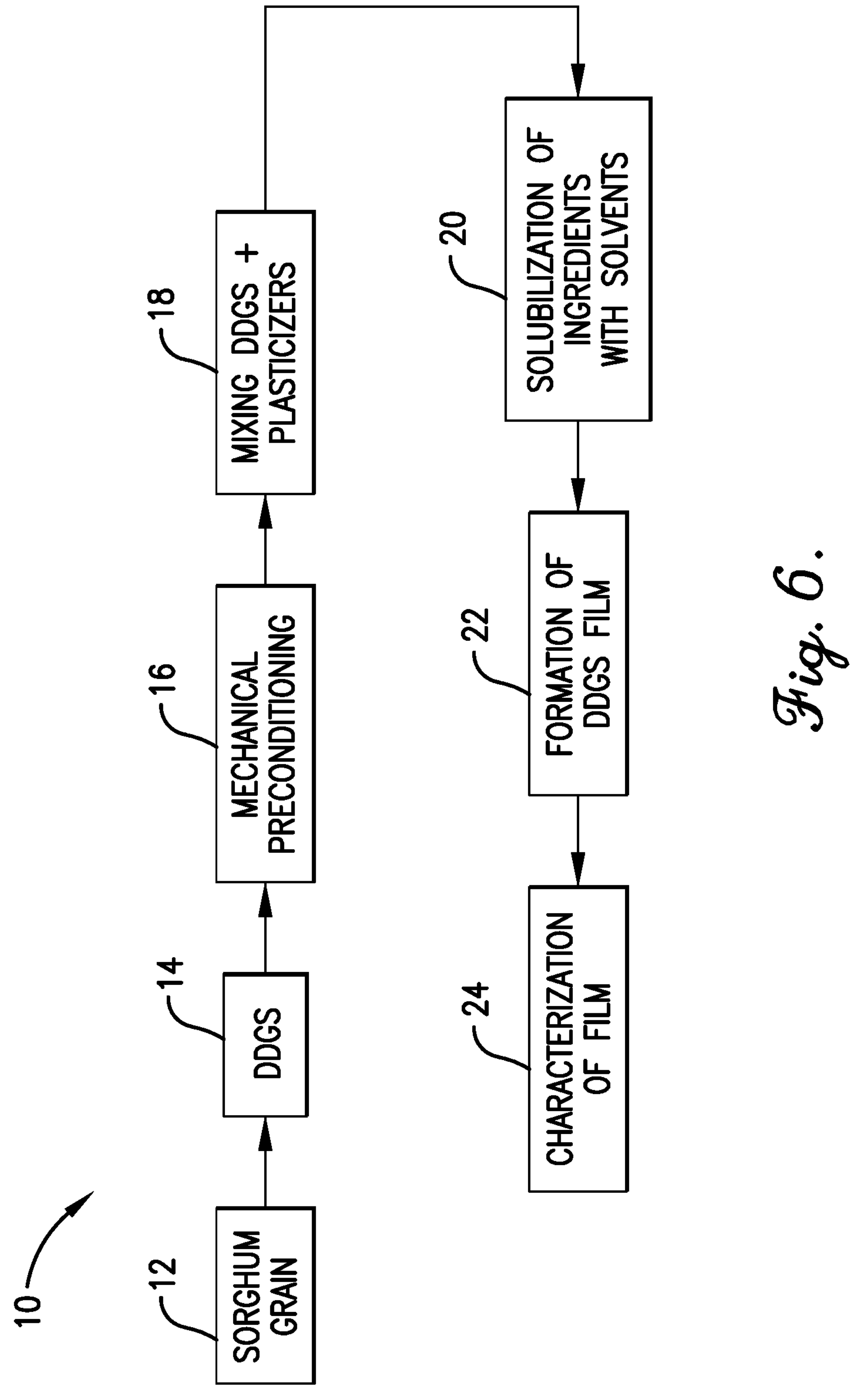
FIG. 6 schematically illustrates an overall process for producing films from DDGS.

Turning first to FIG. 6, a process 10 for producing biodegradable films from DDGS, especially sorghum DDGS is depicted. In one or more embodiments, sorghum grain 12 is processed into sorghum DDGS 14 via a fermentation process (not shown). The sorghum DDGS is then mechanically preconditioned 16 such as through the use of wet (Colloid mill) and dry milling (Udy mill). The DDGS are mixed with plasticizers 18 in trace amounts (e.g., glycerol, xanthan, and locust bean gums), and solubilized in solvents 20 made of water and chloroform (1:0, 1:1, 1:2, 0:1 water: chloroform) with and without ethanol (50%). Films are formed 22 such as through pour-casting and drying (77° F. for 48 h) and optionally characterized 24 for color (hunter LAB colorimeter), thickness (micro-caliper), moisture solubility (IsoTemp Oven), thermal properties (DSC), elasticity, and elongation (texture analyzer). Edible, safe, biodegradable films were successfully prepared from sorghum DDGS. Overall, it was discovered that preconditioning significantly improved the structural integrity to form a suitable film material with desirable properties. Colloid (wet) mill significantly decreased film thickness (145 μm) to form a more uniform structure as compared to Udy (dry) milling (170 μm). Furthermore, the tensile strength (TS) of films before preconditioning was quite low (3 MPa) indicating undesirable films. Wet milling combined with a suitable solvent ratio significantly increased the film strength (a max. of 48.49 MPa at 1:2 chloroform with 50% ethanol). In certain embodiments, it was discovered that films cannot be produced with pure chloroform as the water was needed for plasticizing. Similarly, elongation (% E) increased significantly with wet milling and chloroform concentration with the highest value of 86%. Both preconditioning and solvent type had a significant effect to improve the water-resistance of the films (e.g., 18.34% with wet milling). It has been demonstrated that preconditioning sorghum DDGS via colloid mill combined with a suitable solubilization technique can be used for manufacturing renewable biodegradable plastic film alternatives.

In one or more embodiments, a biodegradable film is formed from DDGS. The DDGS is preferably sorghum DDGS, however, other types of DDGS such as corn, rice, rye, and wheat DDGS may also be employed. DDGS typically comprises unfermented grain residues (protein, fiber, and fat) that has been dried with the concentrated thin stillage produced as a byproduct from an ethanol fermentation system.

The DDGS is preconditioned or milled to reduce the particle size of the DDGS. The milling step can be performed using either wet or dry milling techniques. In one particular embodiment, the milling is a wet milling step using a colloid milling technique. However, dry (Udy) milling may also be utilized.

Once preconditioned, in certain embodiments the size-reduced DDGS can be dried, if wet milling is used, while the DDGS awaits further processing. Although, this drying step is optional and need not be used if the wet, size-reduced DDGS is to be further processed right away. In one or more embodiments, the size-reduced DDGS is dried to a moisture content of that of the original DDGS or less, preferably 12%, 10%, 8%, or 6% by weight or less.

The size-reduced DDGS is combined with one or more plasticizers to form a DDGS mixture. In one or more embodiments, the one or more plasticizers are selected from the group consisting of glycerol, xanthan gum, locust bean gum, and combinations thereof. In one or more embodiments, glycerol is the predominant plasticizer, making up more than 50%, more than 60%, more than 70%, or more than 80% by weight of the total plasticizer content. In one or more embodiments, the DDGS mixture comprises at least 90%, at least 95%, at least 98%, or at least 99% by weight on a dry basis of the size-reduced DDGS. In one or more embodiments, the DDGS mixture comprises no more than 10%, no more than 7.5%, no more than 5%, no more than 2%, or no more than 1% by weight on a dry basis of the one or more plasticizers.

The DDGS mixture is then mixed with respective quantities of water and one or more organic solvents. The water/solvent mixture solubilizes at least a portion of the DDGS and form an aqueous dispersion. In one or more embodiments, the volume ratio of water to the one or more organic solvents is from about 0.25:1 to about 2:1, from about 0.5:1 to about 1.5:1, from about 0.75:1 to about 1.25:1, or about 1:1. In one or more embodiments, the one or more organic solvents comprise chloroform and/or an alcohol such as ethanol.

The aqueous dispersion then undergoes a casting step in which the biodegradable film is formed. Conventional film casting techniques such as pour-casting and extrusion casting, can be employed. The cast film can the be dried in order to remove at least a portion of the water/solvent(s) from the film.

In one or more embodiments, methods according to the present invention produce a film-forming composition that comprises milled distiller's dried grains and solubles (DDGS), especially sorghum DDGS, and one or more plasticizers that have been at least partially solubilized in a liquid medium. As described above, the liquid medium comprising water and at least one organic solvent.

In particular embodiments, the one or more plasticizers are selected from the group consisting of glycerol, xanthan gum, locust bean gum, and mixtures thereof, and the liquid medium comprises water, chloroform, and optionally ethanol. In certain embodiments, the liquid medium comprises at least 25%, at least 30%, at least 35%, at least 40%, at least 45%, or at least 50% by volume ethanol. In alternate embodiments, the liquid medium comprises from about 25% to about 75%, from about 30% to about 70%, from about 35% to about 65%, from about 40% to about 60%, or about 50% ethanol.

The aqueous dispersion of one or more embodiments described herein can be used to form a biodegradable film having certain characteristics making the film suitable for use as packaging materials, and especially food packaging materials. For example, in one or more embodiments, the film has a moisture solubility of less than 40%, less than 35%, less than 30%, or less than 25%. The moisture solubility value may be determined by immersing an approximate 10 g sample of the film in approximately 20 g of distilled water for a 24 hour period at a temperature of about 20° C. The weight of the sample before and after immersion is determined and the difference between those two values represents the amount of film dissolved during the immersion testing. The moisture solubility represents that percentage of the original sample that was dissolved during the testing.

The ability of a film to resist oxygen permeation is an important characteristic to use of the film in food packaging to avoid food spoilage. In one or more embodiments, the films formed from an aqueous dispersion described herein have an oxygen diffusion coefficient (D) of less than 0.6, less than 0.5, less than 0.4, or less than 0.3 mol $cm^{-2}$ $s^{-1}$. Oxygen diffusion coefficient may be determined as described in the Examples below.

The ability of a film to stretch or elongate is also a beneficial characteristic for the film to be used as packaging material. In one or more embodiments, the film made from an aqueous dispersion described herein can exhibit an elongation percentage of at least 25%, at least 30%, at least 35%, at least 40%, at least 45%, or at least 50%. Percent elongation may be determined by stretching a sample of the film at room temperature until failure and then comparing the change in length of the stretched sample to the length of the original, unstretched sample.

In one or more embodiments, the films produced are storage stable in terms of mechanical property stability and microbial activity. Particularly, embodiments of the present invention may be stored for periods of at least 1 month, at least 3 months, or at least 6 months without significant degradation of one or more of the characteristics described above. Moreover, in one or more embodiments, especially embodiments in which sorghum DDGS is used in the manufacture of the film, the film may exhibit some antimicrobial characteristics due to naturally occurring polyphenols and flavonoids present within the DDGS. Also, films can be enriched with polyphenols and flavonoids, such as terpenes and terpenoids, to provide additional antimicrobial activity, if desired. In one or more embodiments, the films may exhibit a two-log reduction in microbial population over 24 hours of storage as measured by in vitro solution assays and plate counts.

In one or more embodiments, the films are quickly biodegradable, especially when landfilled or composted. Particularly, the films exhibit complete disintegration in natural soil, i.e., soil from the ground that is composed of finely ground rock (mineral component) and humus (organic material), within 6 months, 3 months, or 6 weeks.

EXAMPLES

The following examples set forth films and film-forming compositions made in accordance with the present invention. It is to be understood, however, that these examples are provided by way of illustration, and nothing therein should be taken as a limitation upon the overall scope of the invention.

Materials

Sorghum DDGS was provided by USDA Center for Grain and Animal Health Research (USDA ARS) (Manhattan, Kansas, USA). The following reagents were obtained from Sigma-Aldrich (St. Louis, MO, USA): Chloroform (≥99.8%), glycerol (ACS reagent, >99.5%). Ethanol (99.5%, ACS reagent) was obtained from Fisher Scientific (Pittsburgh, PA, USA). Xanthan gum (from *Xanthomonas campestris*), off-white powder, and Locust (carob) bean gum FCC were provided by TCI America (Portland, OR, USA) and CP Kelco (Skensved, Denmark) respectively. Colloid mill (MKO Cone Mill, 2000/4) and Udy Mill were rented from IKA USA (Wilmington, NC, USA). Udy mill (model 3010-018, UDY Corp., Fort Collins, CO) was also obtained from USDA Center for Grain and Animal Health Research (USDA ARS) (Manhattan, Kansas, USA).

Film Preparation

Films were prepared from sorghum DDGS before and after mechanical preconditioning via dry (Udy) and wet (Colloid) milling. Freeze-dried DDGS (10 g) (−80° C., 72 hours) was mixed with glycerol (0.1 g) xanthan (0.01 g) and locust bean gums (0.01 g) (Trinetta et al., 2010). Mixtures were solubilized in solvents made of water and chloroform (1:0, 1:1, 1:2, 0:1 water:chloroform) with and without ethanol (50%). Aqueous solutions were stirred by a magnetic stirrer to homogenize the matrix (25° C., 20 min). Films were prepared by pour-casting and drying (77° F. for 48 h) and characterized for color (hunter LAB colorimeter), thickness (micro-caliper), moisture solubility (IsoTemp Oven), thermal properties (DSC), elasticity and elongation (texture analyzer).

Color Measurement

Films with a diameter of 70 mm were placed on a standard white plate and L*(lightness/brightness), a*(redness/greenness), and b*(yellowness/blueness) values were read via Mini Scan Hunter LAB Colorimeter (MiniScan EZ 4500 L, Reston, VA, USA). Four measurements were taken from each film sample. The color difference (ΔE) was calculated by using the following equation. White color standards of L=92.34, a*=−1.06 and b*=−0.6 were used to calculate ΔE.

$$\Delta E = \sqrt{(\Delta a)^2 + (\Delta b)^2 + (\Delta L)^2}$$

(ΔL): difference in lightness between sample and white standard (Δa): difference in redness between sample and white standard (Δb): difference in yellowness between sample and white standard Thickness of the Films The thickness of the DDGS films was measured with a digital micro caliper (Vernier) at five different locations (25° C.). Measurements were done by quadruplicate and average thickness values were recorded.

Moisture Solubility

Moisture solubility of the films was analyzed according to the protocol taken from Jangchud and Chinnan with minor modifications (1999). DDGS films were prepared in 20 mm×20 mm dimensions and dried (Fisher, IsoTemp Oven, 200 Series, Waltham, MA, USA) (70° C., 24 hours). They were weighed and recorded as the initial dry mass (weight was stabilized to nearest 0.001 g). Then, films were immersed into 20 mL of distilled water in 50 mL of ultra-high-performance centrifuge tubes. They were capped and immersion continued for 24 hours at 20±2° C. The solution was poured onto Whatman #1 filter paper placed in the glass petri plate. The remaining film parts on the filter paper were also recovered by rinsing with 10 mL distilled water and dried in aluminum plates (70° C., 24 hours). Final dry mass was recorded. Measurements were performed by quadruplicate. The solubility of films was calculated by the equation below.

$$\%\ S = \frac{mi - mf}{mi} \times 100\%$$

% S: percent solubility $m_i$: initial dry mass after first drying $m_f$: final dry mass after second drying Texture Analysis Mechanical properties of sorghum DDGS films were tested by Universal-Instron (TA-XT2 Texture Analyzer, Stable Micro Systems (SMS), Haslemere, England) referring to the standard testing methods ASTM D882-9. Force and distance calibrations were done by using 500 g standard weight. 0.1 N load force was applied to create tension for the film samples. The length of the gauge was set to 15 mm and the speed of the crosshead was adjusted to 5 mm/min. DDGS films were cut in a rectangular shape (80 mm×10 mm). Maximum force, tension distance until failure, and work done by the force (area under the Force vs distance curve) were recorded. Tensile strength (TS) and % elongation (% E)) were calculated. Four replicates were used for each DDGS film.

Thermal Analysis

Thermal measurements were done by a heat flux differential scanning calorimeter (Shimadzu DSC-60, Lenexa, KS, USA). 8-10 mg of DDGS film pieces were weighed and subjected to heating on an aluminum pan from 25° C. to 180° C. at a heating rate (β) of 5° C./min with the $N_2$ flow of 0.4 L/min. Melting temperatures and enthalpy of melting were calculated from DSC curves. Four replicates were used for DDGS film. An empty aluminum pan was used as the reference.

Oxygen Permeability

Oxygen permeability of sorghum DDGS films was measured according to Gontard and Thibault (1996) method by making major modifications in unit set-up (Gontard et al., 1996). Two glass chambers (depth: 8 cm deep, diameter: 50 mm) were located at the bottom and top respectively. Chambers were attached with an O-ring shaped filter at which the film samples were placed. 100% oxygen gas was supplied from the inlet valve of the bottom chamber (101.325 Pa). Steady state oxygen concentration was measured by using a hand-held photoionization gas detector (MiniRAE 2000, RAE Systems, Inc., San Jose, CA, USA). Outlet valve was used to release the gas at the end of the experiment. Permeability was calculated by oxygen pressure, transmission rate, and thickness of the film sample. Four replicates were used for each film sample.

Statistical Analysis

Each experiment was performed in quadruplicate. Physical results were expressed by using mean and standard deviation. Results were analyzed using ANOVA for statistical significance. Differences were denoted as small and capital letters on the top of the standard deviation of the results ($p<0.05$) (Minitab 16.2.4.4).

Results & Discussion

Film Moisture Solubility (S %)

Figure 1:
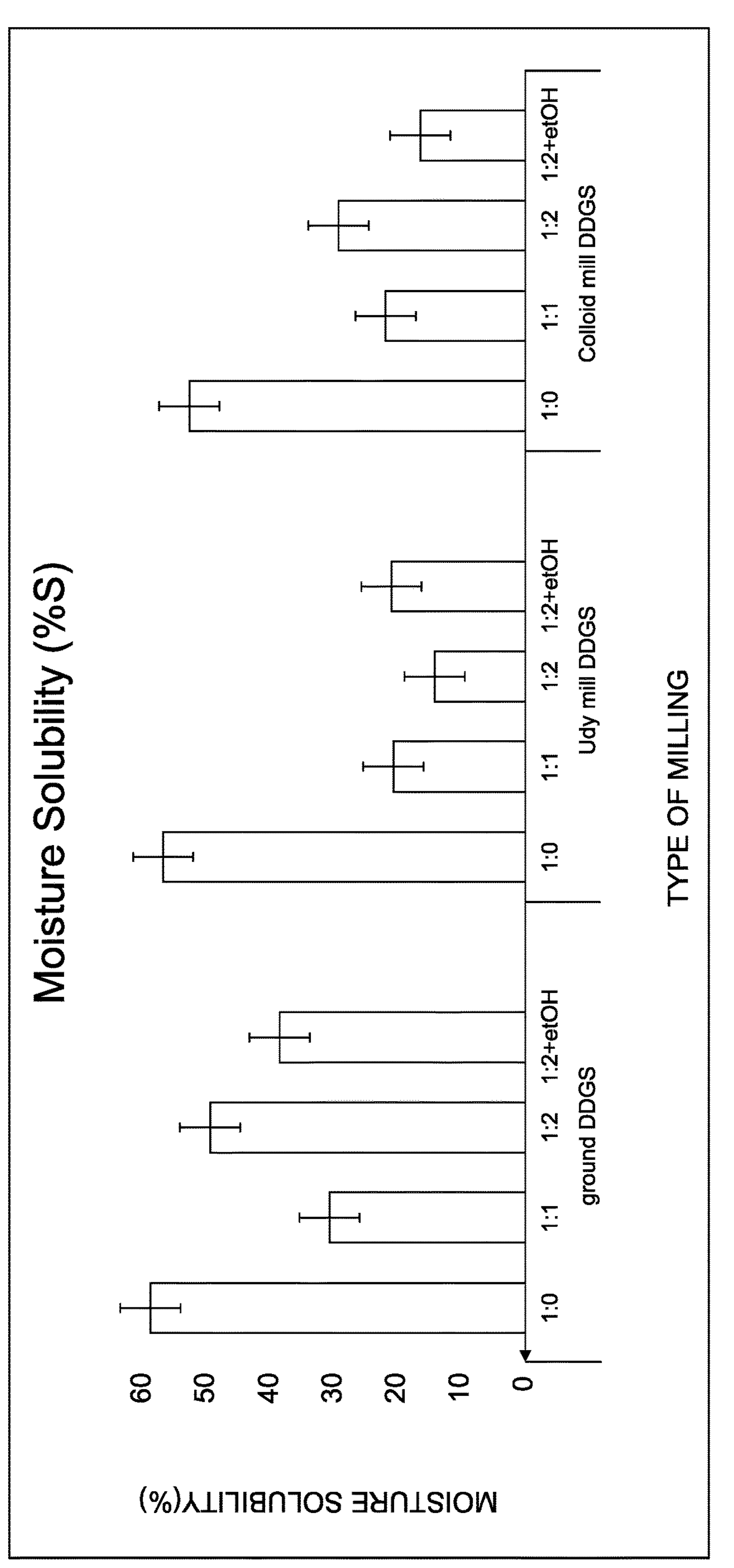
FIG. 1 contains charts depicting moisture solubility values for various sorghum DDGS films.

Moisture solubilities of sorghum DDGS films are summarized in FIG. 1. It was observed that sorghum DDGS films did not lose their physical integrity and stayed as whole films during immersion in water for 24 h. Strong interactions and bonding between sorghum components might be the reason for stable film integrity. Preconditioning had a significant ($p<0.05$) effect on water solubility. Film samples prepared after Colloid or Udy milling had lower moisture solubility and higher physical integrity than films prepared directly from ground sorghum DDGS. Nonetheless, there was no significant difference between the type of milling ($p>0.05$). The milling process might bring kafirin protein and some non-protein components of DDGS into a finer and, therefore, more soluble form. The lowest (14.19%) moisture solubility (% S) was seen in the sorghum DDGS film preconditioned with Udy mill. In addition, there was a significant ($p<0.05$) effect of solvent ratio on moisture solubility of DDGS films. Alteration of solvent ratios may change the solubility of main film powder, plasticizers, gums, and glycerol which are all components of the whole film. This may explain the significant difference in moisture solubility of films prepared by different solvent ratios ($p<0.05$). It can be seen that addition of chloroform as a component of solvent decreased the moisture solubility. It was also observed that solvent made of with ethanol (50%) resulted in lower moisture solubility for DDGS film samples except for films preconditioned with Udy mill. It can be suggested that additional ethanol may help them to be dissolved and incorporated into a film network.

It was expected for sorghum DDGS films to absorb a certain amount of moisture due to carboxyl and hydroxyl groups found in sorghum structures. However, moisture solubilities of sorghum films had lower values than films formulated by carrageen or cellulose and reported in the literature. This might be explained by the physicochemical properties of sorghum DDGS. Major sorghum protein, kafirin, contains more cross-linked disulfide bonds, therefore, had a more hydrophobic structure than other prolamin proteins. Therefore, less amount of film was dissolved in water after immersion. The low solubility of sorghum films is a desired characteristic for a biodegradable food packaging material since high tendency of moisture uptake might adversely change the taste, appearance and shelf life of food.

Color and Thickness of Sorghum DDGS Films

Figure 2:
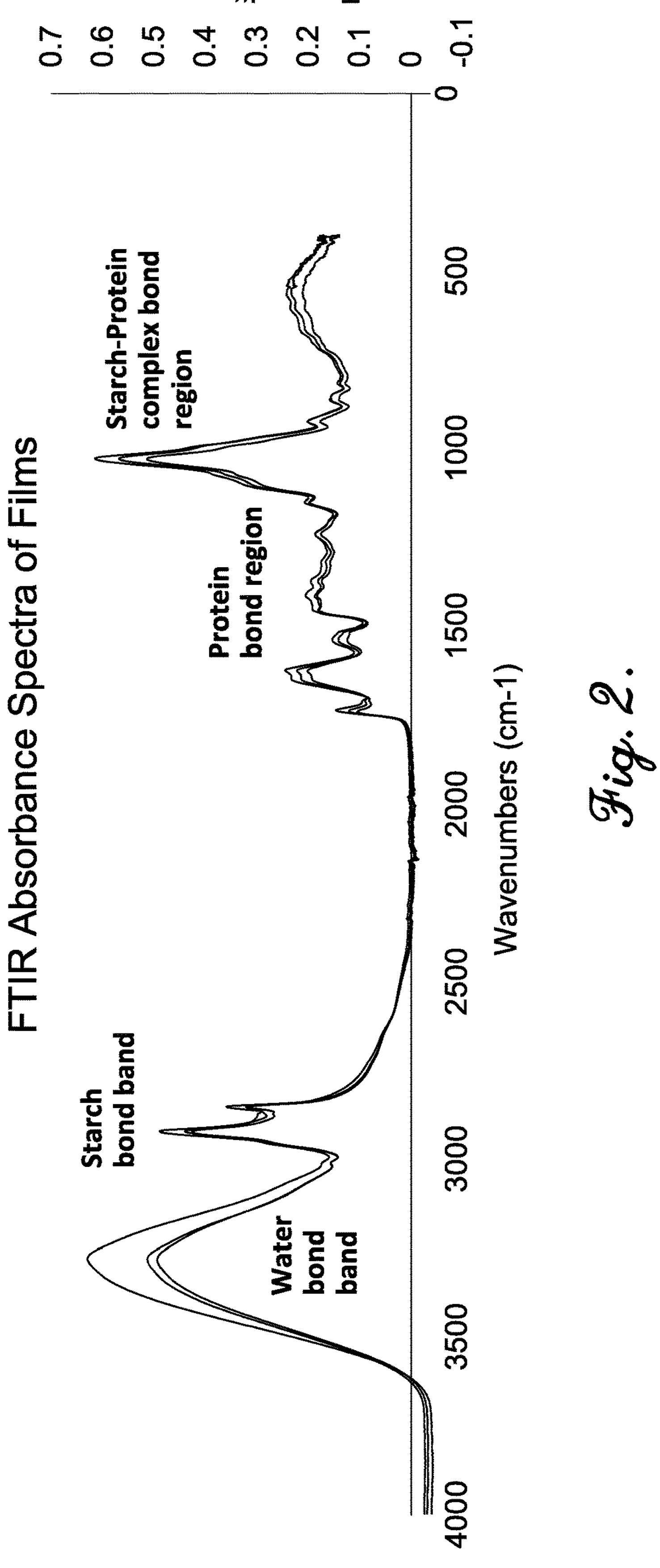
FIG. 2 is a graph of FTIR spectrum for films produced from colloid milled sorghum DDGS.

Characterization of color is one of the most important parameters for the admittance of consumers in food packaging films. The FTIR Absorbance spectra of the films and the visual image of the various sorghum DDGS films are provided in FIGS. 2 and 3. According to the results, ground sorghum DDGS displayed the lowest lightness ($L^*$), lowest redness ($a^*$), and lowest yellowness ($b^*$) which led to the highest color difference ($\Delta E^*$) value among all samples. Preconditioning increased the lightness, redness and yellowness. There was a significant ($p<0.05$) effect of milling on color parameters ($L^*$, $a^*$, $b^*$). Udy mill DDGS films showed the highest lightness ($L^*$) while Colloid mill films indicated the highest redness ($a^*$) and yellowness ($b^*$) values. There was a significant ($p<0.05$) difference between sorghum DDGS films prepared with different solvent (water: chloroform) ratios. Increased redness ($a^*$) occured when higher amount of chloroform was used. Color values of films solubilized by different solvent ratios (water and chloroform (1:0, 1:1, 1:2, 0:1 water:chloroform) with and without ethanol (50%)) might be attributed to variations in solvent evaporation rate and assembly of protein during casting procedure.

The thickness of biodegradable films influences functional properties and physical durability. It was deduced that preconditioning of DDGS and the ratio of solvent (water: chloroform ratio (v/v)) were major parameters affecting the thickness of films. There was a significant ($p<0.05$) effect of preconditioning on thickness of the films. Colloid and Udy milling resulted in decreased thickness in sorghum DDGS films. Colloid (wet) mill significantly ($p<0.05$) decreased thickness (140 μm) to form a more uniform structure as compared to Udy (dry) milling (170 μm). This result suggested that particle size of the sorghum DDGS was significantly reduced during both milling processes (Alvarenga et al., 2018). Sorghum DDGS with small particle sizes enabled creation of uniformly distributed suspensions, which explained the thinner films. However, solvent ratio (water: chloroform ratio (v/v)) did not have a significant influence ($p>0.05$) on the thickness of the sorghum films.

Texture Analysis of Sorghum DDGS Films

Figure 4:
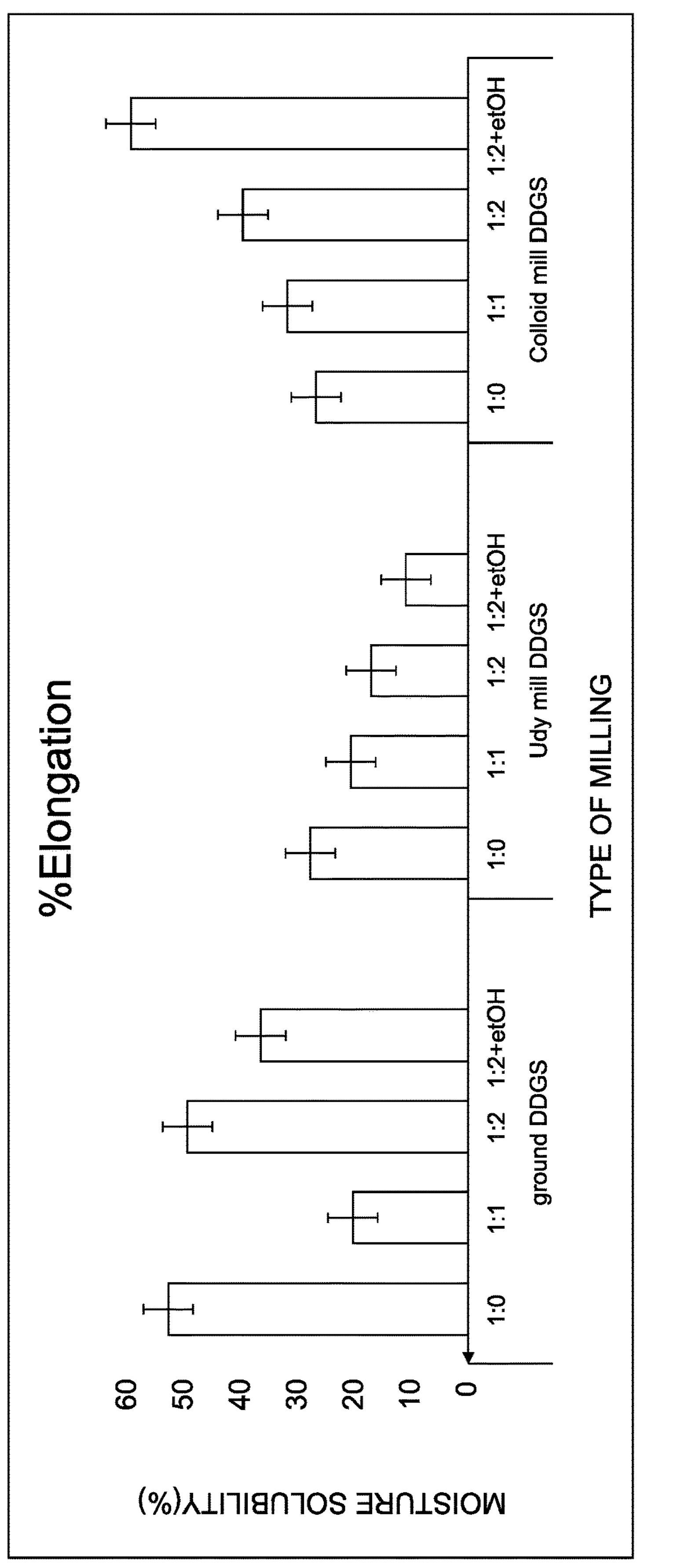
FIG. 4 contains charts showing elongation percentage for various sorghum DDGS films.

Mechanical properties of biodegradable films are important parameters to preserve the integrity of the packaging matrix and sustain physical barrier against external factors. The mechanical properties of sorghum DDGS films were determined by measuring tensile strength (TS) and elongation at break (% E) values. The results showed that the mechanical properties of the films changed with pre-processing and solvent ratio. There was a significant ($p<0.05$) effect of milling on tensile strength (TS) and % Elongation (E %), see FIG. 4. Tensile strength (TS) of films before preconditioning were quite low (2.62 MPa) indicating undesirable films. Wet (colloid) milling significantly ($p<0.05$) increased the film strength (a max. of 48.49 MPa). This result suggested that preconditioning might enable the establishment of bonds between protein and non-protein structures of DDGS, therefore, films may have stronger film network (higher TS) and higher extensibility (higher E %). In addition to this, solvent ratio had statistically significant ($p<0.05$) effect on mechanical properties of DDGS films. Development of internal stress during the drying process of films could be one of the reasons affecting mechanical properties. Volume fraction of solvent used may lead to undesired internal stress in the film, thus, strength or elongation of film network might reduce. When the solvent ratio of 1:2 chloroform with 50% ethanol was used, the highest tensile strength (TS) (48.49 MPa) was obtained.

Visual Appearance of Films

Figure 3:
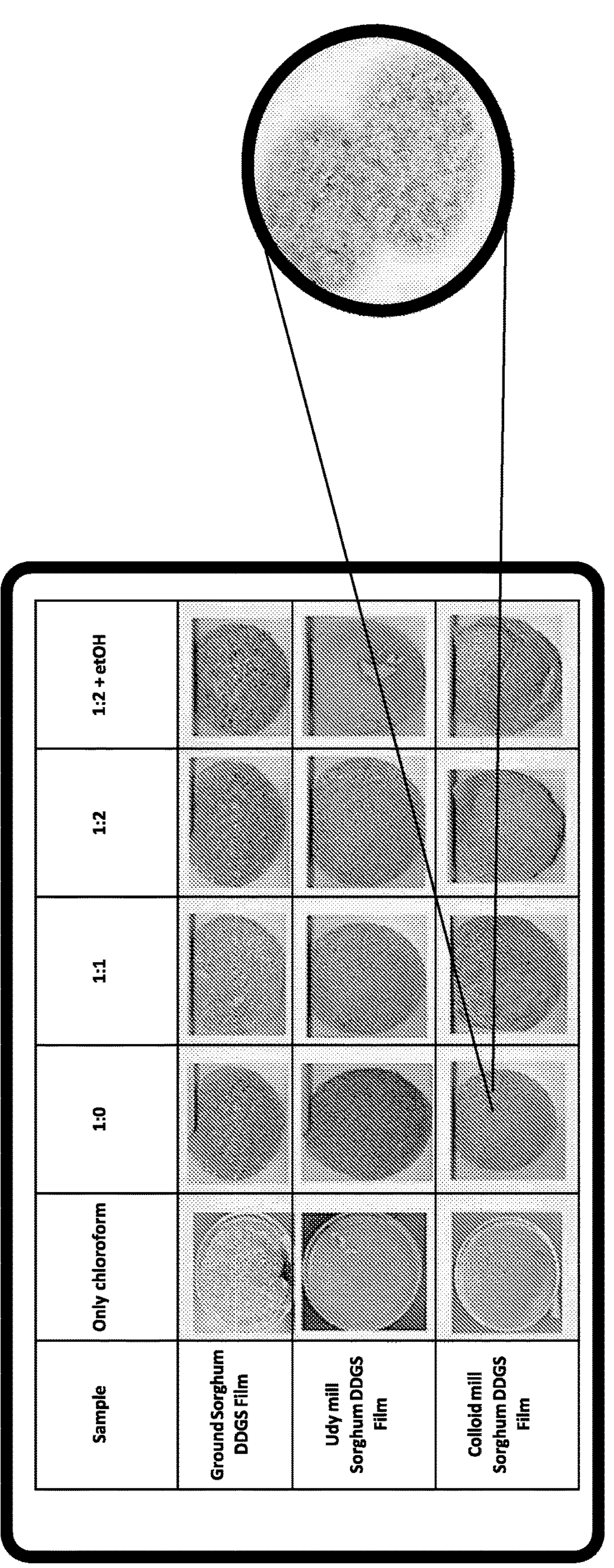
FIG. 3 contains images of various sorghum DDGS films.

Visual inspection of food packaging film is an important feature for consumers. Sorghum DDGS films prepared by milling and different solvent ratios had a diversity of color from light brown to orange (FIG. 3). All of the film surfaces were semi-opaque. Films had rougher surfaces than other plant-based films in the literature which might be due to larger particles of sorghum DDGS. Preconditioning visually improved the structural integrity and homogenity of DDGS films. All the sorghum films except for those made from ethanol-containing dispersions were homogeneous and void-free. On the other hand, ground sorghum DDGS films prepared with the mixture of water-chloroform-ethanol had visible bubbles, large porosities, and weaker texture. It could be directly related to the ethanol part of the solvent mixture. It is believed that alcohol groups might not dissolve major components of grains (mainly protein and starch) and may result in small phase separations during film casting.

Thermal Properties of Sorghum Films

Figure 5:
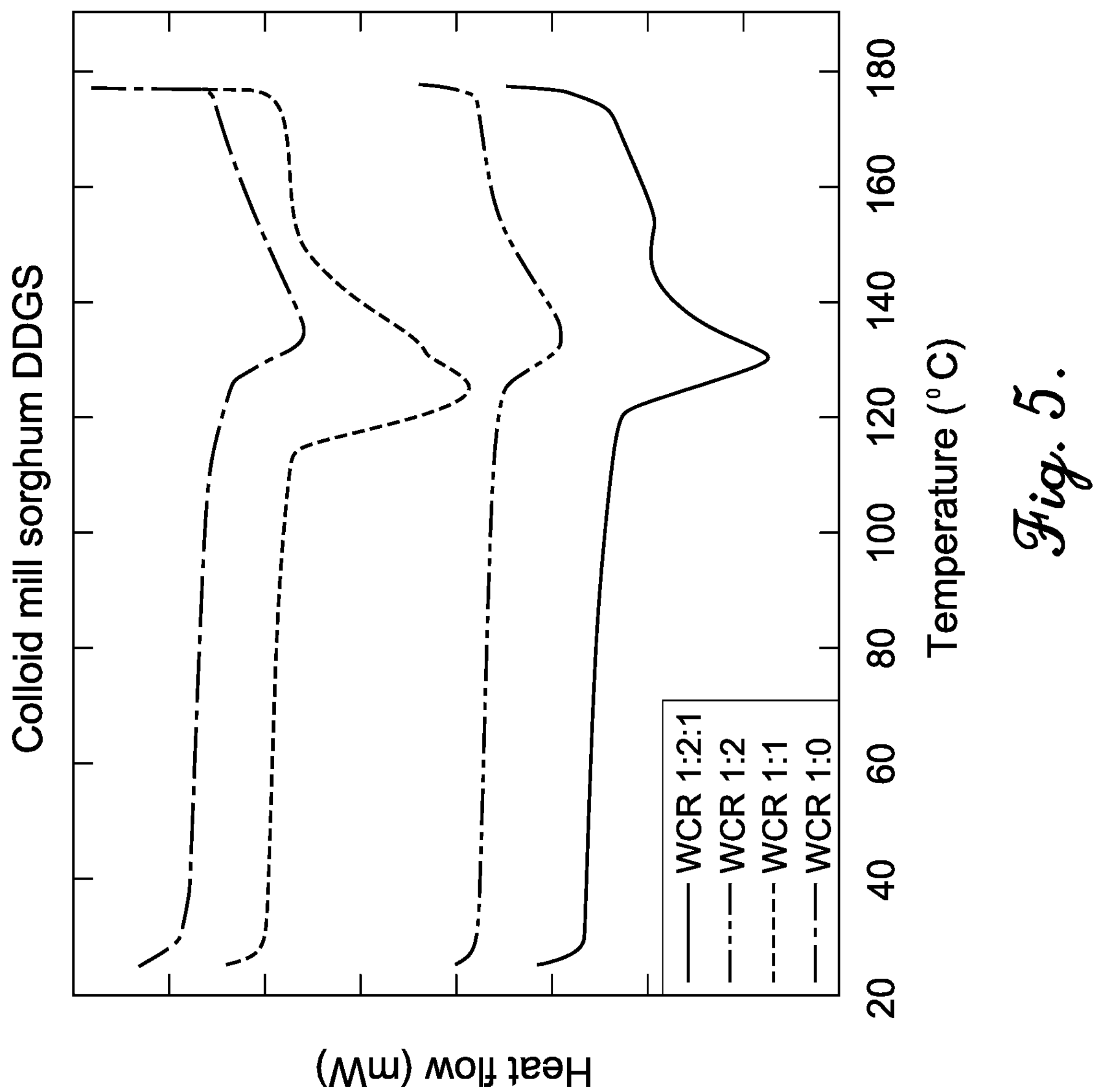
FIG. 5 depicts DSC curves of sorghum DDGS preconditioned by wet (colloid) mill using different water:chloroform ratios.

Differential scanning calorimetry (DSC) was used to characterize the thermal properties of sorghum DDGS films. The results are summarized in FIG. 5. DSC thermograms revealed that none of the sorghum DDGS film showed an obvious glass transition temperature ($T_g$). There could be several reasons behind this consequence. Glass transition temperature is an important characteristic for polymers and biodegradable films since it may determine temperature ranges and process conditions for various processes. There are still controversial points about glass transition change and the molecular factors affecting the identification of it. However, it has been discovered that chemical cross-link density and network structure of polymers had a significant effect on glass transition temperature ($T_g$). In addition to this, the physicochemical nature of polymers, their interactions in the matrix, and inter-molecular cohesion may influence glass transition temperature ($T_g$). From the general point of view, polymers have a glassy structure below $T_g$ while they display rubbery above that temperature. It has been also found that as the cross-link and intermolecular interactions become stronger and nonuniform, there might be the non-noticeable change in glass transition temperature. It has been known that major (protein, starch) and minor (fiber) components of sorghum might include highly cross-linked web-like structures even they are exposed to milling. Therefore, it might be possible not to observe significant transition from rubbery to glassy state in this study.

There was a significant ($p<0.05$) effect of preconditioning on melting temperatures (Tm) and enthalpy of melting (ΔH). The highest melting temperature (Tm) was observed in Udy milled sorghum DDGS film (138.87° C.) while the lowest one was seen in Colloid milled sorghum DDGS film (119.66° C.). Moreover, the highest enthalpy of melting (−1.33 J) was seen in Colloid milled DDGS film whereas, the lowest result (0.07 J) was recorded in the film prepared with non-milled DDGS. It was apparent that preconditioning significantly ($p<0.05$) improved the thermal properties of DDGS films. However, there were some fluctuations in melting temperature and ethalpy of preconditioned DDGS films. They might occur due to multiple interactions between compounds in film matrix. The variations between melting temperatures were due to the structure of starch (mainly amylose), the composition of lipid, and the denaturation of the protein. On the other hand, the influence of these compounds and their effects on the thermal properties of sorghum films have still not been clarified. In addition to this, there was significant ($p<0.05$) effect of solvent ratio on thermal properties of DDGS films. The highest melting temperature (138.87° C.) was seen when 1:2 chloroform with 50% ethanol was used. Similarly, the highest enthalpy of melting (−1.33 J) was recorded at the same solvent ratio. However, preconditioning was more effective on thermal properties of DDGS films.

CONCLUSION

It was demonstrated that preconditioning sorghum DDGS via colloid and Udy milling combined with a suitable solubilization technique can be used for manufacturing renewable biodegradable plastic film alternatives. As revealed from the results, pretreatment enhanced the lightness (L*), redness (a*), and yellowness (b*) values and contributed to the desirable film appearance. Besides, the colloid (wet) mill significantly declined the thickness of films and contributed to forming a more uniform structure. Moisture solubility results suggested that DDGS films did not lose their physical integrity. Both preconditioning and solvent concentration remarkably improved the water resistance of the films. Moreover, it was seen that films could not be generated with pure chloroform as water was needed for plasticizing. When colloid (wet) milling was combined with suitable solvent concentration (1:2 chloroform (v/v) with 50% ethanol) tensile strength and % elongation can be enhanced and films can have desired mechanical properties.

The results revealed that desired biodegradable packaging films can be generated from sorghum DDGS solubilized in solvents made of water, chloroform and ethanol (1:2 (v/v) with ethanol 50%) and pre-conditioned via wet milling.

We claim:

1. A method of forming a biodegradable film comprising:

milling a quantity of distiller's dried grains with solubles (DDGS) to reduce the particle size of the DDGS;

combining the size-reduced DDGS with one or more plasticizers to form a DDGS mixture;

mixing the DDGS mixture with respective quantities of water and one or more organic solvents to solubilize at least a portion of the DDGS and form an aqueous dispersion; and forming the biodegradable film from the aqueous dispersion.

2. The method of claim 1, wherein the milling step comprises a wet milling step.

3. The method of claim 2, wherein the wet milling step comprises colloid milling.

4. The method of claim 1, wherein the DDGS comprises sorghum DDGS.

5. The method of claim 1, wherein the one or more plasticizers are selected from the group consisting of glycerol, xanthan gum, locust bean gum, and combinations thereof.

6. The method of claim 5, wherein the one or more plasticizers comprises predominantly glycerol.

7. The method of claim 1, wherein the volume ratio of water to the one or more organic solvents is from about 0.25:1 to about 2:1.

8. The method of claim 1, wherein the one or more organic solvents comprise chloroform and/or ethanol.

9. The method of claim 1, wherein the forming step comprises drying the aqueous dispersion to form the biodegradable film.

10. A method of forming a biodegradable film comprising:

wet milling a quantity of sorghum distiller's dried grains with solubles (DDGS) to reduce the particle size of the DDGS;

optionally, drying the wet milled DDGS to form dried, size-reduced DDGS particles;

combining the size-reduced DDGS particles with a quantity of glycerol and least one of xanthan gum and locust bean gum to form a DDGS mixture;

mixing the DDGS mixture with respective quantities of water and chloroform, and optionally ethanol, to form an aqueous dispersion; and forming the biodegradable film from the aqueous dispersion.

11. A film-forming composition comprising:

milled distiller's dried grains with solubles (DDGS) and one or more plasticizers that have been at least partially solubilized in a liquid medium, the liquid medium comprising water and at least one organic solvent.

12. The film-forming composition of claim 11, wherein the DDGS comprises sorghum DDGS.

13. The film-forming composition of claim 11, wherein the one or more plasticizers are selected from the group consisting of glycerol, xanthan gum, locust bean gum, and mixtures thereof.

14. The film-forming composition of claim 11, wherein the liquid medium comprises water, chloroform, and optionally ethanol.

15. The film-forming composition of claim 14, wherein the liquid medium comprises at least 25% by volume ethanol.

16. The film-forming composition of claim 14, wherein the volume ratio of water to chloroform in the liquid medium is from about 0.25:1 to about 2:1.

17. The film-forming composition of claim 11, wherein the composition comprises at least 98% by weight on a dry basis of the DDGS.

18. The film-forming composition of claim 11, wherein the composition comprises no more than 2% by weight on a dry basis of the one or more plasticizers.

19. A biodegradable film comprising the film-forming composition according to claim 11.

20. The biodegradable film according to claim 19, wherein the film has a moisture solubility of less than 40%.

21. The biodegradable film according to claim 19, wherein the film has an oxygen diffusion coefficient (D) of less than 0.6 mol $cm^{-2}s^{-1}$.

22. The biodegradable film according to claim 19, wherein the film exhibits an elongation percentage of at least 25%.

* * * * *